US006354580B1

(12) United States Patent
Nagai et al.

(10) Patent No.: US 6,354,580 B1
(45) Date of Patent: Mar. 12, 2002

(54) ELECTRIC CLAMP APPARATUS

(75) Inventors: Shigekazu Nagai, Tokyo; Hiroshi Yumiba, Ibaraki-ken; Akio Saitoh, Kawaguchi, all of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/672,036

(22) Filed: Sep. 29, 2000

(30) Foreign Application Priority Data

Oct. 1, 1999 (JP) .......................................... 11-282195

(51) Int. Cl.[7] .................................................. B23Q 3/02

(52) U.S. Cl. ....................... 269/225; 269/228; 269/243; 269/237; 269/285

(58) Field of Search .......................... 269/32, 225, 226, 269/228, 243, 285, 237–239

(56) References Cited

FOREIGN PATENT DOCUMENTS

EP 0 243 599 11/1987

*Primary Examiner*—Robert C. Watson
(74) *Attorney, Agent, or Firm*—Paul A. Guss

(57) ABSTRACT

Disclosed is an electric clamp apparatus comprising a rotary driving section for making rotary driving in accordance with an electric signal; a gear mechanism for transmitting rotary driving force of the rotary driving section; a ball screw mechanism for converting rotary motion transmitted by the gear mechanism into rectilinear motion; and a toggle link mechanism for converting the rectilinear motion transmitted by the ball screw mechanism into rotary action of a clamp arm.

15 Claims, 8 Drawing Sheets

ELECTRIC CLAMP APPARATUS

BACKGROUND OF THE INVENTION

1. Field of the Invention

The present invention relates to an electric clamp apparatus which makes it possible to clamp a workpiece to be positioned on a carriage and transported, for example, in an automatic assembling line.

2. Description of the Related Art

Conventionally, for example, in an automatic assembling line for automobiles, a workpiece such as an engine is transported by using a carriage, and it is subjected to a variety of machining steps and assembling steps at respective stations.

In each of the stations, it is necessary to position the workpiece at a predetermined position in order to fix the workpiece to a jig. In recent years, a system is adopted, in which a clamp apparatus is provided for the carriage itself, the workpiece is transported in a state of being clamped on the carriage, and only the carriage is positioned in each of the stations.

In this system, a fluid pressure-operated cylinder, for example, a pneumatic cylinder is used as a driving source for driving the clamp apparatus.

However, the clamp concerning the conventional technique as described above involves the following inconvenience. That is, for example, when the pneumatic cylinder is used as the driving source, then the air piping is required, and the piping operation is complicated. Further, the installation space is restricted due to a plurality of tubes to be used for the air piping.

Further, it is necessary to install, for example, a fluid pressure-operated apparatus (for example, pressure reducing valve) for controlling the supply pressure so that the pressure (source pressure) of the compressed air supplied from a compressed air supply source is adapted to the pneumatic cylinder to be used. An inconvenience arises such that it is impossible to contemplate effective utilization of the installation space.

Furthermore, it is demanded to enhance the clamping force on the workpiece by further increasing the driving force of the driving source.

In view of the above, as shown in FIG. 8, a toggle lever-tightening apparatus 3 is suggested, in which the rotary motion of a motor 1 is converted into the rectilinear motion of a screw spindle 2, and thus the screw spindle 2 is displaced in the upward and downward directions (see the specification of European Patent Publication No. 0243599A).

The toggle lever-tightening apparatus 3 concerning the conventional technique adopts the following arrangement. That is, the motor 1 drives a pinion 5 by the aid of a drive shaft 4, the pinion 5 is meshed with a gear 7 having teeth 6 at the inner side, and the teeth 6 are cooperated with the screw spindle 2. The screw spindle 2 is displaced in the upward and downward directions depending on the direction of rotation of the motor 1.

However, the toggle lever-tightening apparatus 3 concerning the conventional technique described above adopts the arrangement in which the rotary driving force of the motor 3 is directly transmitted to the screw spindle 2 by the aid of the gear 7. In the case of the gear 7 which is formed to have a thin-walled wall thickness, the meshing portion with respect to the screw spindle 2 is designed to be small. It is feared that the durability is deteriorated by the load exerted on the meshing portion, and hence any fluctuation occurs in the rectilinear motion of the screw spindle 2.

Further, the toggle lever-tightening apparatus 3 concerning the conventional technique described above involves the following inconvenience. That is, the large shock arises at the displacement terminal position of the rotation of the arm 8. The vibration, which is caused by the shock, is transmitted to the meshing portion between the screw spindle 2 and the gear 7 and to the meshing portion between the pinion 5 and the gear 7 respectively. As a result, the smooth rectilinear motion of the spindle 2 is obstructed. Further, the durability is deteriorated for the members (screw spindle 2, gear 7, and pinion 5) for constructing the meshing portions.

SUMMARY OF THE INVENTION

A general object of the present invention is to provide an electric clamp apparatus which makes it possible to eliminate the complicated air piping or the like, and effectively utilize the installation space.

A principal object of the present invention is to provide an electric clamp apparatus which makes it possible to further increase the clamping force by using, as a driving source, a rotary driving source which performs rotary driving in accordance with an electric signal.

Another object of the present invention is to provide an electric clamp apparatus which makes it possible to avoid the transmission of the vibration caused by the shock, to a gear mechanism or the like in a body, by buffering the shock which is brought about when a clamp arm arrives at the displacement terminal position.

Still another object of the present invention is to provide an electric clamp apparatus which makes it possible to smoothly displace, in the linear direction, a ball screw shaft to which the rotary driving force of a rotary driving source is transmitted.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
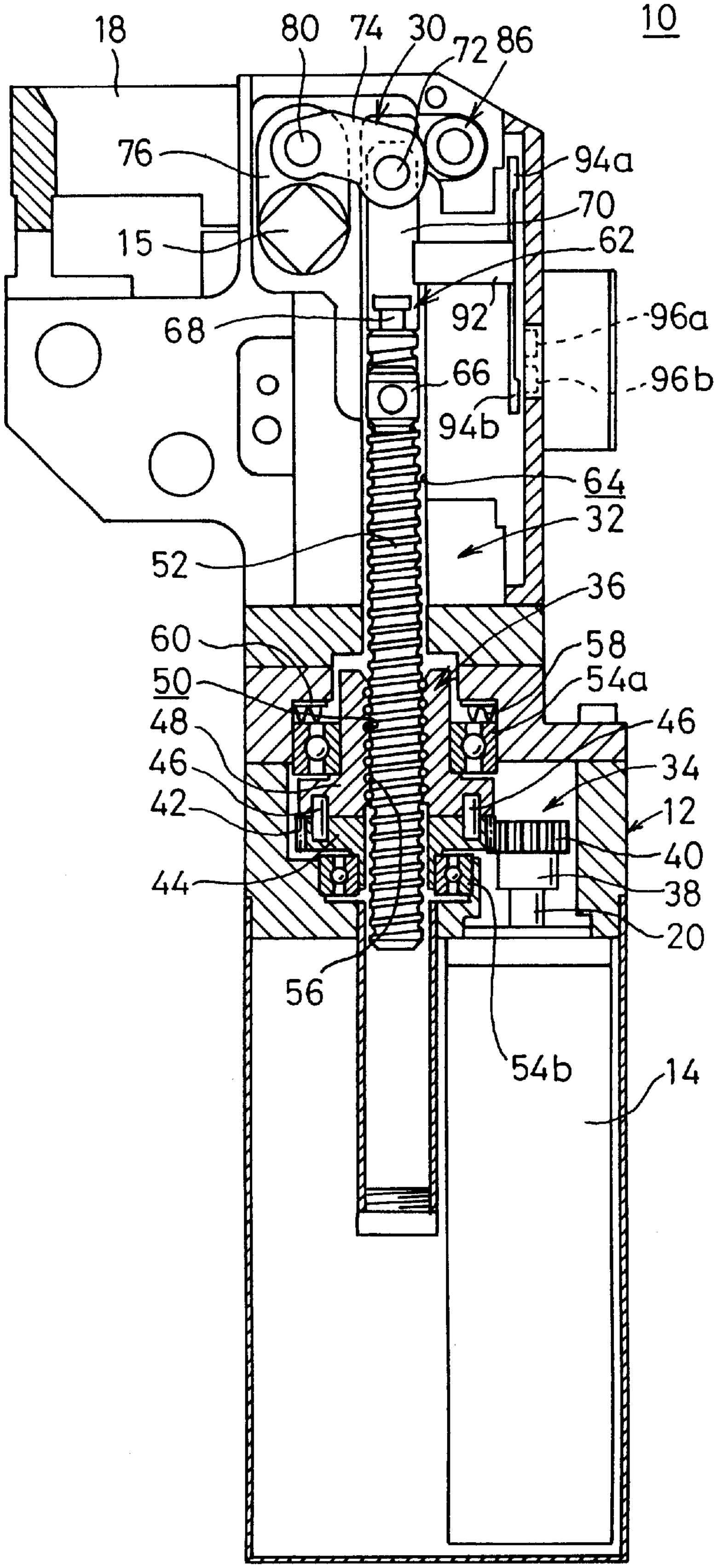
FIG. 1 shows a vertical sectional view taken along the axial direction, illustrating an electric clamp apparatus according to an embodiment of the present invention.

An electric clamp apparatus 10 according to an embodiment of the present invention is shown in FIG. 1.

The electric clamp apparatus 10 comprises a body 12, a rotary driving section 14 which is arranged on the lower side of the body 12, and a clamp arm 18 which is connected to a bearing section 15 having a rectangular cross section protruding to the outside through a pair of substantially circular openings (not shown) formed through the body 12.

Figure 2:
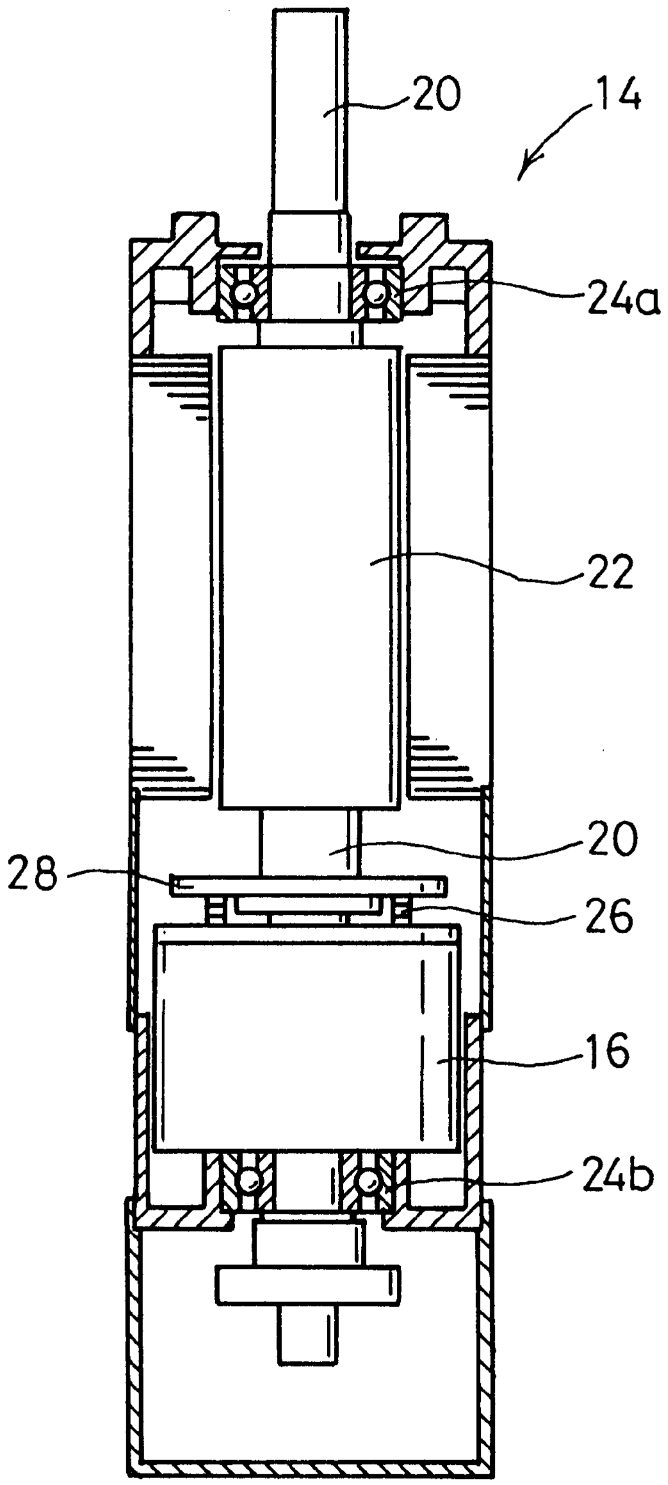
FIG. 2 shows a vertical sectional view illustrating a rotary driving section for constructing the electric clamp apparatus shown in FIG. 1.

As shown in FIG. 2, the rotary driving section 14 is composed of, for example, an ignition motor or a brushless motor. The rotary driving section 14 comprises a rotary driving source 16 which is driven and rotated when an electric signal is inputted, and a brake mechanism 22 which is formed and integrated into one unit together with the rotary driving source 16 and which stops the rotation of a drive shaft 20 of the rotary driving source 16, for example, upon the cutoff of the power source such as the power failure.

The rotary driving source 16 includes an unillustrated stator, an unillustrated rotor which is rotated integrally with the drive shaft 20, a first bearing member 24*a* and a second bearing member 24*b* which rotatably support the drive shaft 20, and a lining member 26 which is provided on the first end side in the axial direction of the rotor and which is rotatable integrally with the drive shaft 20.

The brake mechanism 22 includes a disk member 28 which is displaceable substantially in parallel to the axis of the drive shaft 20 (in the vertical direction in FIG. 2) in accordance with the magnetically exciting action of an unillustrated solenoid arranged at the inside. In this arrangement, when the power source is cut off, for example, due to the power failure, then the disk member 28 is displaced toward the lining member 26 to press the lining member 26, and thus the braking state is given. On the other hand, the braking state is canceled by applying the electric power to the solenoid to separate the disk member 28 from the lining member 26 in accordance with the magnetically exciting action of the solenoid.

As shown in FIG. 1, a rotary driving force-transmitting section 32, which transmits the rotary driving force of the rotary driving source 16 to a toggle link mechanism 30, is provided in the body 12. The rotary driving force-transmitting section 32 comprises a gear mechanism 34 and a ball screw mechanism 36.

The gear mechanism 34 includes a first gear 38 having a small diameter which is coaxially connected to the drive shaft 20 of the rotary driving source 16, and a second gear 44 having a large diameter which is formed with second teeth 42 to be meshed with first teeth 40 of the first gear 38 and which is arranged to be substantially parallel to the axis of the drive shaft 20. On the other hand, the ball screw mechanism 36 includes a substantially cylindrical ball screw nut 48 which is provided to be rotatable integrally with the second gear 44 by the aid of a plurality of connecting pins 46, and a ball screw shaft 52 which is displaceable in the axial direction by making engagement with a penetrating screw hole 50 of the ball screw nut 48. The second gear 44 and the ball screw nut 48 are rotatably supported by a first bearing member 54*a* and a second bearing member 54*b* respectively.

In this arrangement, the diameter of the second gear 44 is set to be larger than the diameter of the first gear 38.

Accordingly, it is possible to adjust the distance between the axes of the ball screw shaft 52 and the drive shaft 20 of the rotary driving source 16.

The ball screw nut 48 is provided with a plurality of balls 56 which roll along an unillustrated circulating track. The ball screw shaft 52 is arranged to be displaceable in the axial direction in accordance with the rolling action of the balls 56. Reference numerals 58, 60 indicate a washer and a ring for holding the first bearing member 54*a* respectively.

In this arrangement, the second gear 44 and the ball screw nut 48 are connected in an integrated manner by the aid of the plurality of connecting pins 46, and they are provided to be rotatable integrally about the center of rotation of the central axis of the ball screw shaft 52 by the aid of the first and second bearing members 54*a*, 54*b*. Therefore, the ball screw shaft 52 is movable upwardly and downwardly in accordance with the rotary action of the second gear 44 and the ball screw nut 48.

The toggle link mechanism 30, which converts the rectilinear motion of the ball screw shaft 52 into the rotary motion of the clamp arm 18 by the aid of a knuckle joint 62, is provided at the first end of the ball screw shaft 52. A rotation-preventive member 66, which functions to prevent the rotation of the ball screw shaft 52 by making engagement with a groove 64 having a rectangular cross section formed on the inner wall surface of the body 12, is installed on the first end side of the ball screw shaft 52.

The knuckle joint 62 comprises a knuckle pin 68 having a substantially T-shaped cross section which is connected to the first end of the ball screw shaft 52, and a knuckle block 70 which has a forked section to be engaged with the head of the knuckle pin 68.

Figure 3:
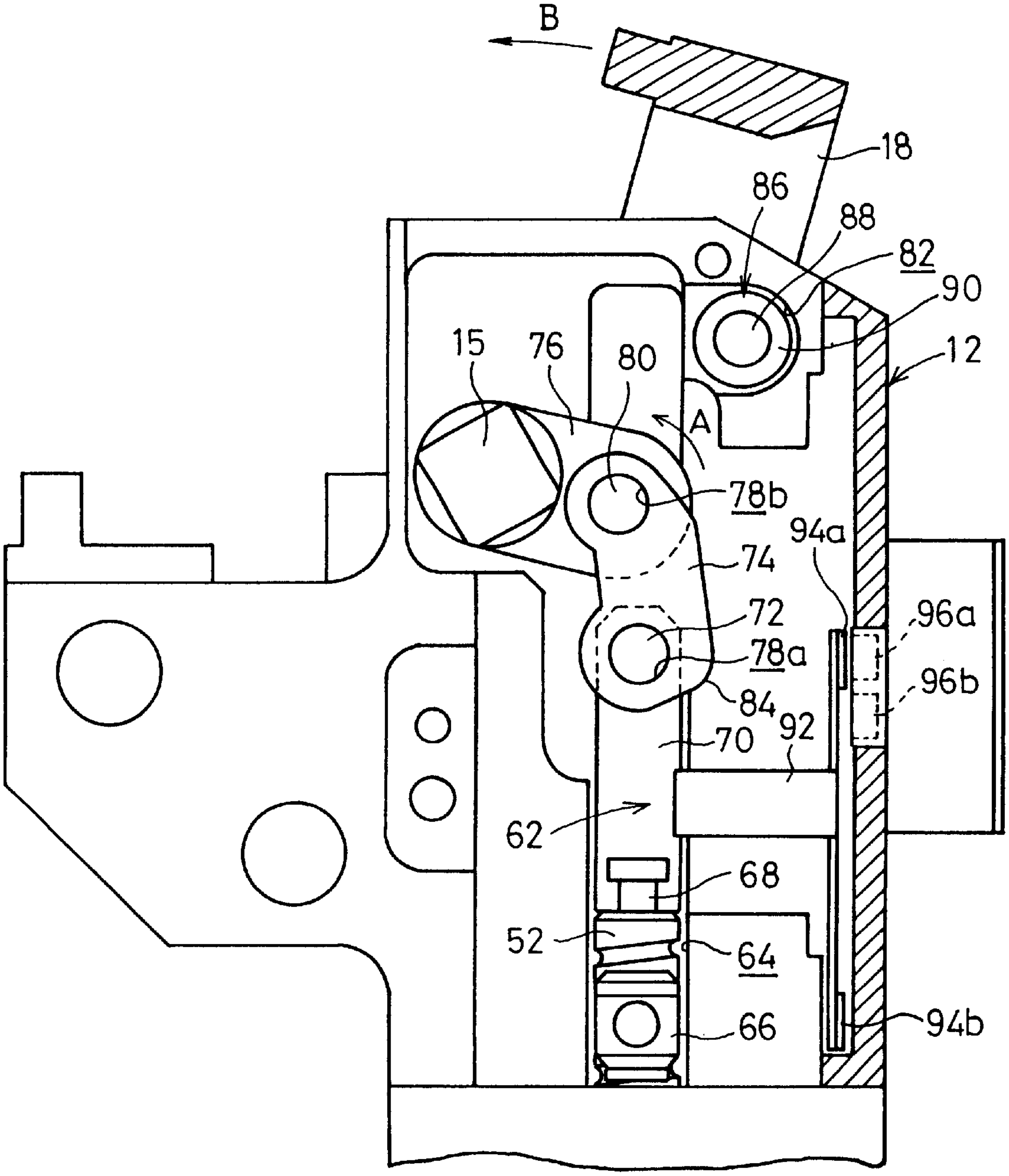
FIG. 3 shows a magnified vertical sectional view illustrating a link mechanism for constructing the electric clamp apparatus shown in FIG. 1.
Figure 4:
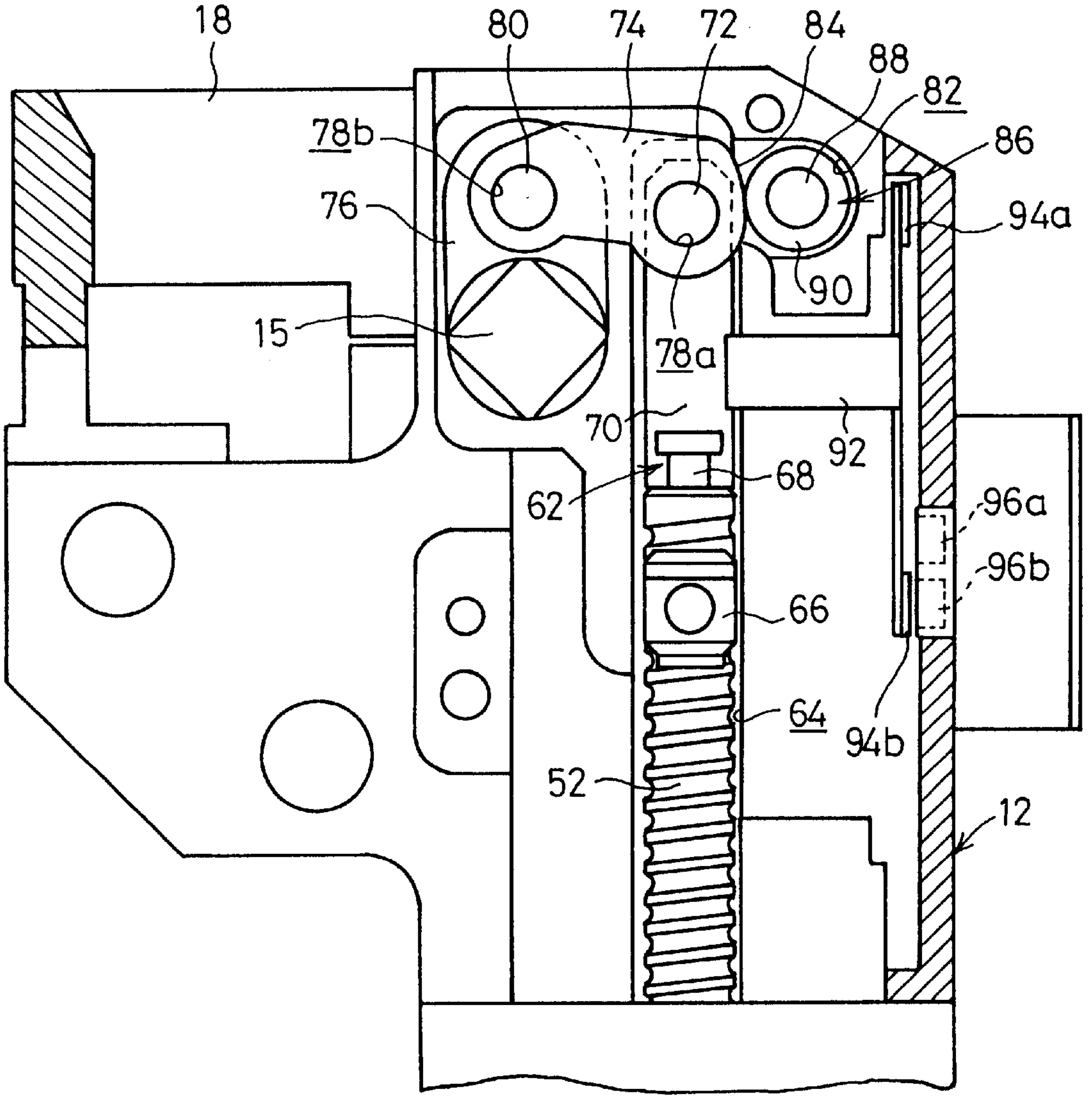
FIG. 4 illustrates the operation depicting a clamped state.

As shown in FIGS. 3 and 4, the toggle link mechanism 30 comprises a link plate 74 which is connected to the upper side of the knuckle block 70 by the aid of a first pin member 72, and a support lever 76 which is rotatably supported by the pair of substantially circular openings (not shown) formed through the body 12.

The link plate 74 is interposed between the knuckle block 70 and the support lever 76, and it functions to link the knuckle joint 62 and the support lever 76. That is, the link plate 74 is formed with a pair of holes 78*a*, 78*b* which are separated from each other by a predetermined spacing distance. The link plate 74 is connected to the knuckle block 70 by the aid of the first pin member 72 rotatably fitted to the first hole 78*a*, and it is connected to the support lever 76 by the aid of a second pin member 80 which is rotatably fitted to the second hole 78*b*.

The support lever 76 has the bearing section 15 having a rectangular cross section which is formed to protrude in a direction substantially perpendicular to the axis of the ball screw shaft 52 and which is exposed to the outside from the body 12 via the unillustrated openings. The clamp arm 18 for clamping an unillustrated workpiece is detachably installed to the bearing section 15. In this arrangement, the support lever 76 is provided to make the rotary action integrally with the clamp arm 18.

The rectilinear motion of the ball screw shaft 52 is transmitted to the support lever 76 via the knuckle joint 62 and the link plate 74. The support lever 76 is designed to be rotatable by a predetermined angle about the center of rotation of the bearing section 15 which protrudes from the pair of openings formed through the body 12.

Recesses 82 each having a semicircular cross section are formed on the upper side of the inner wall surfaces of the body 12 respectively. As shown in FIG. 4, a needle roller 86, which is rotatable by making engagement with a circular arc-shaped side surface section 84 of the link plate 74, is provided for the recess 82. The needle roller 86 comprises a pin member 88 which is fixed on the side of the body 12, a ring-shaped roller 90 which is rotatable in a predetermined direction about the center of rotation of the pin member 88, and a plurality of needles (not shown) which are arranged in the circumferential direction between the outer circumferential surface of the pin member 88 and the inner circumferential surface of the roller 90.

When the toggle link mechanism 30 is operated, the needle roller 86 is rotated along the circular arc-shaped side surface section 84 of the link plate 74. Accordingly, the link plate 74 is smoothly lifted and tilted. As a result, the rectilinear motion of the ball screw shaft 52 is smoothly converted into the rotary motion of the clamp arm 18 by the aid of the toggle link mechanism 30.

A pair of metal detecting objects 94*a*, 94*b* are connected to the knuckle block 70 via a dog 92. A pair of sensors 96*a*, 96*b*, which sense the positions of the metal detecting objects 94*a*, 94*b* by utilizing the change of impedance in accordance with the approaching action of the metal detecting objects 94*a*, 94*b*, are provided on the outer wall surface of the body 12. The rotation position of the clamp arm 18 can be detected by sensing the metal detecting object 94*a* (94*b*) by using the sensor 96*a* (96*b*).

The rotation of the drive shaft 20 is stopped by the brake mechanism 22 provided for the rotary driving section 14 upon the cutoff of the power source such as the power failure. Accordingly, it is possible to reliably maintain the clamped state of the workpiece. Therefore, even when the power source is cut off, it is possible to prevent the workpiece from falling which would be otherwise caused by being released from the clamped state.

The electric clamp apparatus 10 according to the embodiment of the present invention is basically constructed as described above. Next, its operation, function, and effect will be explained.

At first, the electric clamp apparatus 10 is fixed at a predetermined position by the aid of an unillustrated fixing means. It is assumed that the brake mechanism 22, which is provided for the rotary driving section 14, is in a state of being released from the braking operation. The following description will be made assuming that the initial position is given at the bottom dead center in the unclamped state as shown in FIG. 3.

After performing the preparatory operation as described above, the unillustrated power source is energized at the initial position to drive and rotate the rotary driving source 16. The first gear 38, which is meshed with the drive shaft 20 of the rotary driving source 16, is rotated about the center of rotation of the drive shaft 20. The second gear 44 is rotated in the direction opposite to the direction of the first gear 38 by the aid of the second teeth 42 meshed with the first teeth 40 of the first gear 38. The ball screw nut 48, which is integrally connected to the second gear 44 by the aid of the plurality of connecting pins 46, is rotated. The ball screw shaft 52, which is engaged with the ball screw nut 48, is moved upwardly in accordance with the rolling action of the plurality of balls 56.

As described above, the rotary driving force of the rotary driving source 16 can be increased by allowing the gear mechanism 34 to intervene between the rotary driving source 16 and the ball screw mechanism 36. Paradoxically, the miniaturized motor having the small rotary driving force can be used by providing the gear mechanism 34. As a result, it is possible to miniaturize the entire electric clamp apparatus.

The rectilinear motion of the ball screw shaft 52 is transmitted to the toggle link mechanism 30 via the knuckle joint 62, and it is converted into the rotary motion of the clamp arm 18 in accordance with the rotary action of the support lever 76 which constitutes the toggle link mechanism 30.

That is, the rectilinear motion of the ball screw shaft 52 causes the action of the force to press the knuckle joint 62 and the link plate 74 in the upward direction. The pressing force exerted on the link plate 74 rotates the link plate 74 by a predetermined angle about the support point of the first pin member 72. Further, the support lever 76 is rotated in the direction of the arrow A in accordance with the linking action of the link plate 74 (see FIG. 3).

Therefore, the clamp arm 18 is rotated by a predetermined angle in the direction of the arrow B about the support point of the bearing section 15 of the support lever 76. Accordingly, the clamp arm 18 arrives at the clamped state to grip the workpiece. When the ball screw shaft 52 is slightly moved upwardly after the clamp arm 18 stops the rotary action to give the clamped state, the ball screw shaft 52 arrives at the top dead center to give the displacement terminal position of the ball screw shaft 52 (see FIG. 4). The arrival at the top dead center is confirmed by sensing the metal detecting object 94*b* by the sensor 96*b*.

In the clamped state described above, the energizing state is continued for the rotary driving source 16. Therefore, the clamping force for gripping the workpiece is held to be substantially constant by the aid of the clamp arm 18.

In order to cancel the clamped state and give the unclamped state, the polarity of the current is inverted for the rotary driving source 16. Accordingly, the first gear 38 is rotated in a direction opposite to the above, and the ball screw shaft 52 is moved downwardly. Thus, the clamp arm 18 is displaced in the direction to make separation from the workpiece, resulting in restoration to the initial position.

According to the embodiment of the present invention, the torque of the rotary driving source 16 is increased by providing the gear mechanism 34 as the rotary driving force-transmitting section 32. Thus, it is possible to further enhance the clamping force of the clamp arm 18 with respect to the workpiece.

In the embodiment of the present invention, the rotary driving source 16 such as the motor is used as the driving source. Accordingly, the complexity of the air piping or the like is eliminated. Further, it is unnecessary to install the fluid pressure-operated apparatus or the like for controlling the supply pressure. Therefore, it is possible to effectively utilize the installation space.

Further, in the embodiment of the present invention, the second gear 42, which constitutes the gear mechanism 34, is not directly meshed with the ball screw shaft 52. The ball screw nut 48 and the second gear 42 are connected in the integrated manner by the aid of the plurality of connecting pins 46. The ball screw nut 48 and the ball screw shaft 52 are directly engaged with each other. Accordingly, it is possible to set the large meshing portion with respect to the ball screw shaft 52. As a result, it is possible to decrease the load exerted on the meshing portion between the ball screw shaft 52 and the ball screw nut 48, and it is possible to improve the durability. Further, it is possible to avoid the fluctuation of the ball screw shaft 52, and it is possible to ensure the smooth rectilinear motion.

The embodiment of the present invention has been explained based on the use of the ball screw mechanism 36. However, there is no limitation thereto. It is a matter of course that an unillustrated feed screw mechanism including, for example, a sliding screw may be used.

Figure 5:
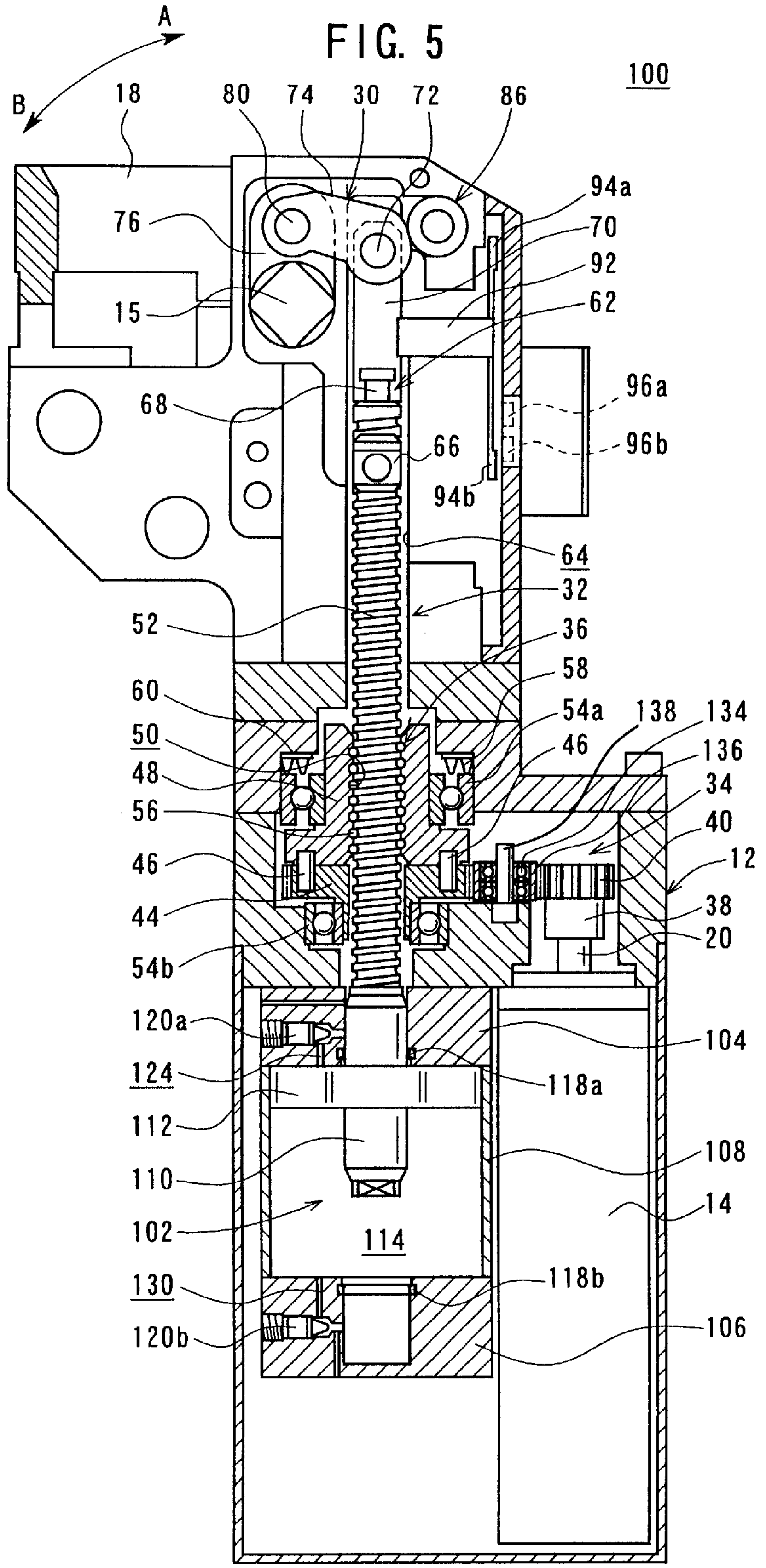
FIG. 5 shows a vertical sectional view taken along the axial direction, illustrating an electric clamp apparatus according to another embodiment of the present invention.
Figure 6:
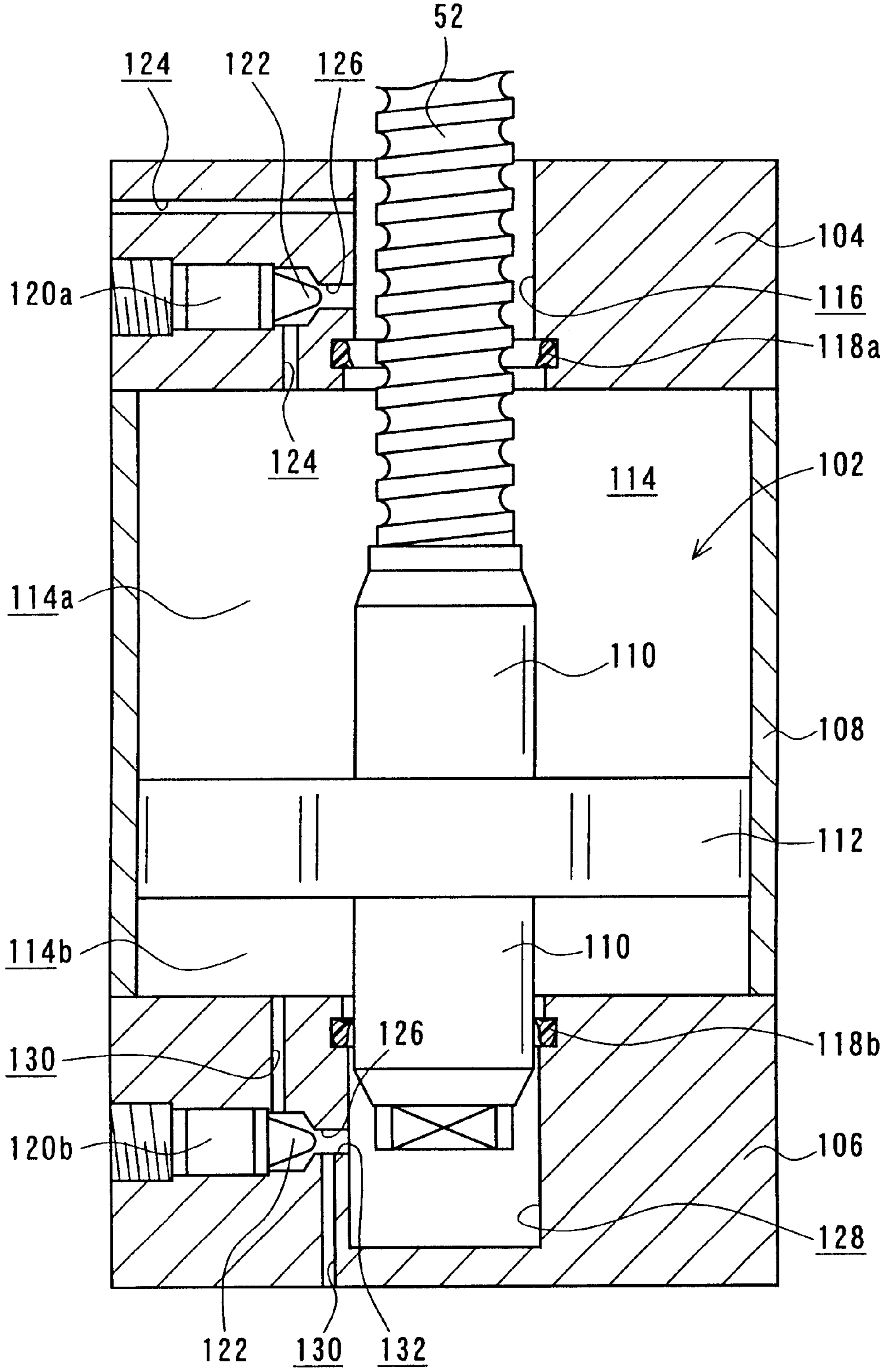
FIG. 6 shows a magnified vertical sectional view illustrating an air cushion mechanism provided for the electric clamp apparatus shown in FIG. 5.
Figure 7:
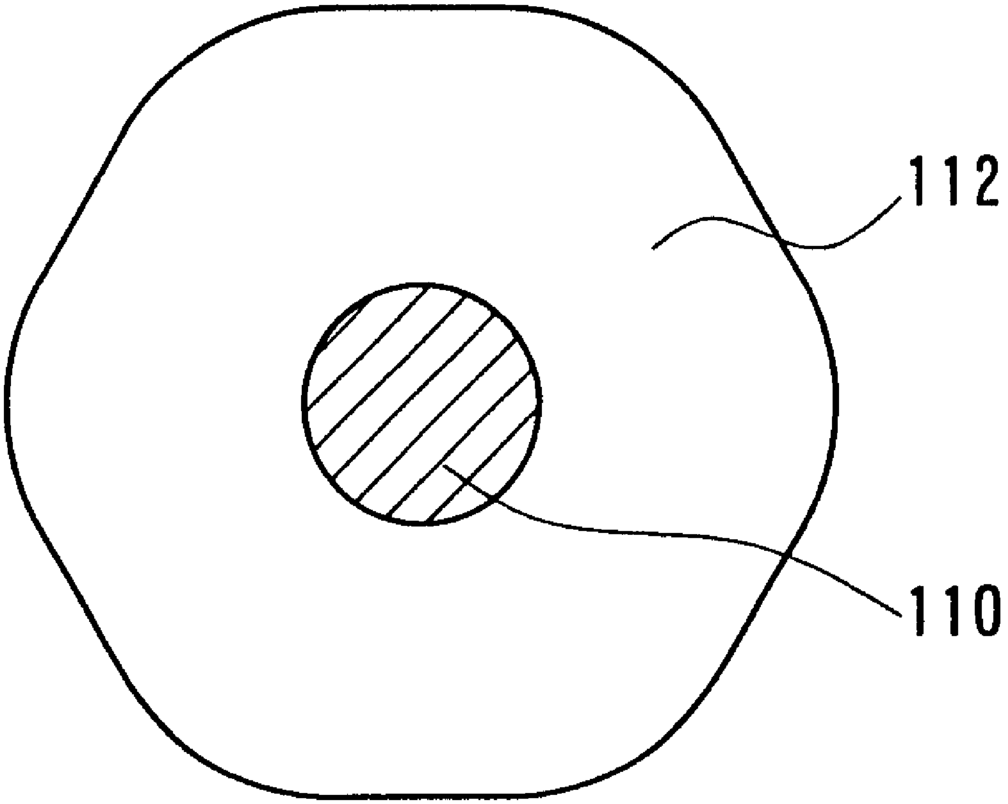
FIG. 7 shows, with partial cross section, a plan view illustrating the shape of a piston.
Figure 8:
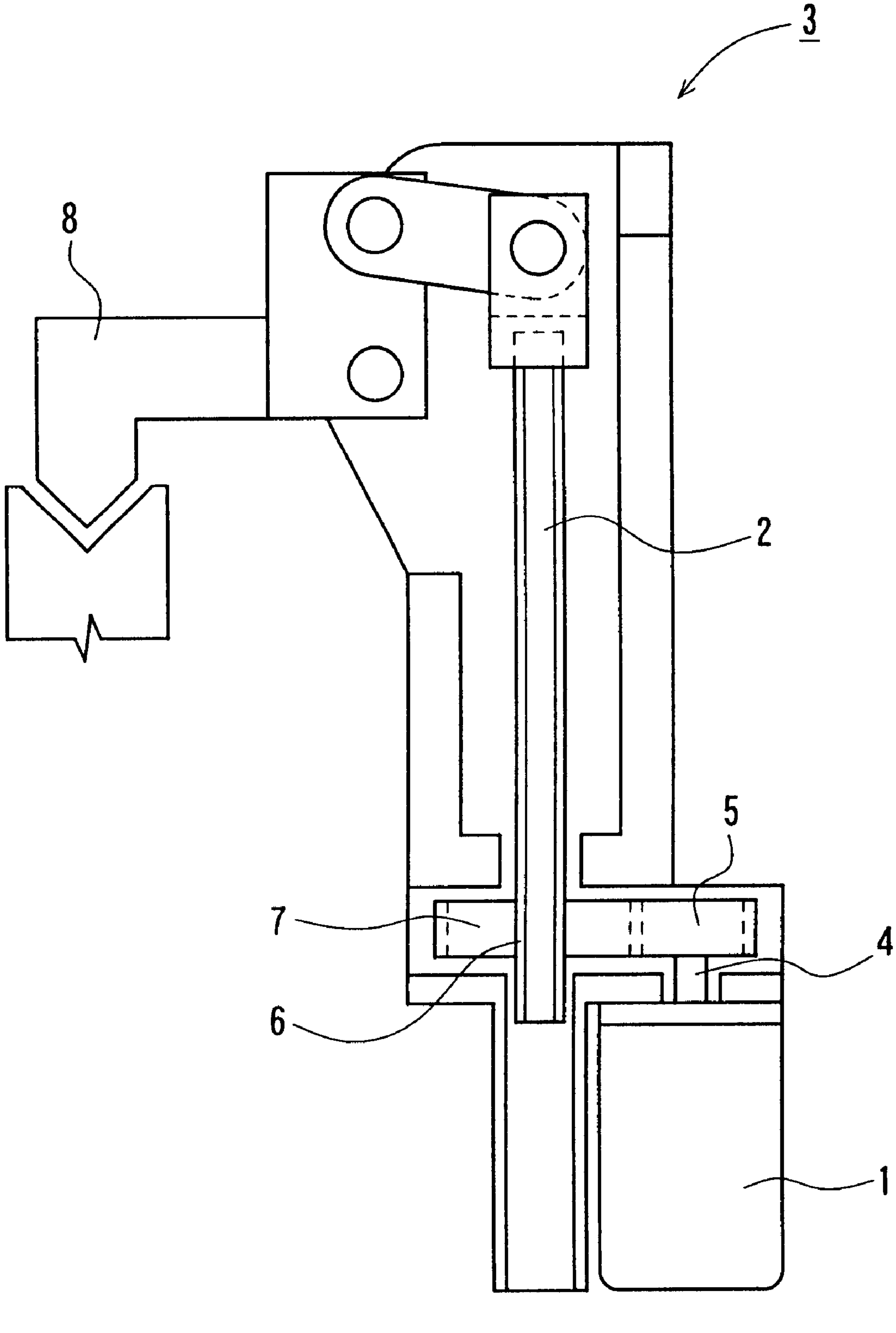
FIG. 8 shows a side view illustrating a schematic arrangement of a toggle lever-tightening apparatus concerning the conventional technique.

Next, an electric clamp apparatus 100 according to another embodiment of the present invention is shown in FIGS. 5 to 7. The same constitutive components as those of electric clamp apparatus 10 shown in FIG. 1 are designated by the same reference numerals, detailed explanation of which will be omitted.

As shown in FIG. 5, the electric clamp apparatus 100 according to the another embodiment is provided with an air cushion mechanism 102 for mitigating the shock generated at the displacement terminal position when the clamp arm 18 is rotated in the direction of the arrow A or B.

The air cushion mechanism 102 is provided on the lower side of the ball screw shat 52, and it includes a first block member 104 which is disposed on the upper side, a second block member 106 which is disposed on the lower side, a cylinder 108 which is integrally connected between the first block member 104 and the second block member 106, a columnar piston rod 110 which is connected to the lower side of the ball screw shaft 52 to make displacement in an integrated manner, and a piston 112 which is connected to the piston rod 110 to make sliding displacement along the cylinder 108. An unillustrated piston packing is installed to the outer circumferential surface of the piston 112 by the aid of an annular groove.

In this arrangement, a closed chamber 114 is formed by the first block member 104, the second block member 106, and the cylinder 108. The chamber 114 is divided by the piston 112 into an upper chamber 114*a* and a lower chamber 114*b*. As shown in FIG. 7, the piston 112 is formed to have a substantially hexagonal cross section in which the corners are chamfered to give curved lines. The inner circumferential surface of the cylinder 108 is also formed to have a substantially hexagonal cross section corresponding to the shape of the piston 112. Accordingly, the rotation-preventive function is effected for the ball screw shaft 52.

As shown in FIG. 6, a through-hole 116, which is provided to allow the ball screw shaft 52 and the piston rod 110 to make displacement in the upward and downward directions, is formed through the first block member 104. A ring-shaped first cushion packing 118*a* is installed with an annular groove to the inner circumferential surface of the through-hole 116. The outer circumferential surface of the piston rod 110, which is formed to be slightly larger than the diameter of the ball screw shaft 52, is surrounded by the first cushion packing 118*a*. Thus, the sealing function is exhibited. The interior of the upper chamber 114*a* is maintained in an air-tight manner.

A first throttle valve 120*a* is screwed into a screw hole of the first block member 104. A tapered section 122 having its gradually decreasing diameter is formed at a first end of the first throttle valve 120*a*. The tapered section 122 of the first throttle valve 120*a* faces an orifice 126 having a small diameter of a first passage 124 for making communication between the interior of the upper chamber 114*a* and the outside. The flow rate of the air to be discharged from the inside of the upper chamber 114*a* to the outside via the first passage 124 is regulated by suppressing the flow rate of the air flowing through the first passage 124 by increasing the screwing amount of the first throttle valve 120*a*.

A recess 128, which is faced by the end of the piston rod 110, is formed for the second block member 106 disposed on the lower side. A ring-shaped second cushion packing 118*b* is installed with an annular groove to the inner circumferential surface of the recess 128. The outer circumferential surface of the piston rod 110 is surrounded by the second cushion packing 118*b*. Thus, the sealing function is exhibited. The interior of the lower chamber 114*b* is maintained in an air-tight manner.

A second throttle valve 120*b* is screwed into a screw hole of the second block member 106. A tapered section 122 having its gradually decreasing diameter is formed at a first end of the second throttle valve 120*b*. The tapered section 122 of the second throttle valve 120*b* faces an orifice 126 having a small diameter of a second passage 130 for making communication between the interior of the lower chamber 114*b* and the outside. The flow rate of the air to be discharged from the inside of the lower chamber 114*b* to the outside via the second passage 130 is regulated by suppressing the flow rate of the air flowing through the second passage 130 by increasing the screwing amount of the second throttle valve 120*b*.

Each of the first throttle valve 120*a* and the second throttle valve 120*b* is not limited to the variable throttle, which may be a fixed throttle.

A communication passage 132, which communicates with the second passage 130, is formed for the recess 128. When the piston rod 110 is sealed by the second cushion packing 118*b*, the air, which remains on the lower side of the recess 128, is discharged to the outside via the communication passage 132.

Further, as shown in FIG. 5, an intermediate gear 136, which is rotatably supported by the aid of a bearing member 134, is provided between the first gear 38 and the second gear 44. The bearing member 134 is rotatably supported by a shaft member 138 which is fixed to the body 12. In this arrangement, the distance between the axes of the drive shaft 20 of the rotary driving source 16 and the ball screw shaft 52 can be adjusted and set to be a predetermined distance by providing the intermediate gear 136.

The electric clamp apparatus 100 according to the another embodiment is operated as follows. That is, before the clamp arm 18 is rotated in the direction of the arrow B to give the clamped state, the air in the upper chamber 114*a* is pressed by the piston 112 which is moved upwardly integrally with the ball screw shaft 52. The air is discharged to the outside via the first passage 124. During this process, the air, which flows through the first passage 124, is throttled to give a predetermined flow rate by the aid of the tapered section 122 of the first throttle valve 120*a* facing the small diameter orifice 126 of the first passage 124. Accordingly, it is possible to buffer the shock generated when the clamp arm 18 arrives at the displacement terminal position.

On the other hand, before the clamp arm 18 is rotated in the direction of the arrow A to give the unclamped state, the air in the lower chamber 114*b* is pressed by the piston 112 which is moved downwardly integrally with the ball screw shaft 52. The air is discharged to the outside via the second passage 130. During this process, the air, which flows through the second passage 130, is throttled to give a predetermined flow rate by the aid of the tapered section 122 of the second throttle valve 120*b* facing the small diameter orifice 126 of the second passage 130. Accordingly, it is possible to buffer the shock generated when the clamp arm 18 arrives at the displacement terminal position on the unclamped side.

As described above, when the clamp arm 18 is rotated to arrive at the displacement terminal position, the shock is suppressed by the air cushion mechanism 102. Therefore, the vibration, which is caused by the shock, is prevented from transmission, for example, to the meshing portion between the ball screw nut 48 and the ball screw shaft 52, the meshing portion between the second gear 44 and the intermediate gear 136, and the meshing portion between the first gear 38 and the intermediate gear 136. As a result, the smooth rectilinear motion of the ball screw shaft 52 is ensured, and it is possible to improve the durability of the members for constructing the meshing portions.

The other functions and effects are the same as those of the electric clamp apparatus 10 shown in FIG. 1, detailed explanation of which is omitted.

What is claimed is:

1. An electric clamp apparatus capable of gripping a workpiece by means of a rotatable clamp arm, said clamp apparatus comprising:

a rotary driving source for making rotary driving in accordance with an electric signal;

a gear mechanism for transmitting rotary driving force of said rotary driving source;

a feed screw mechanism for converting rotary motion transmitted by said gear mechanism into rectilinear motion; and a toggle link mechanism for converting said rectilinear motion transmitted by said feed screw mechanism into rotary action of said clamp arm, wherein:

said gear mechanism includes a first gear which is coaxially connected to a drive shaft of said rotary driving source, and a second gear which is provided with second teeth to be meshed with first teeth of said first gear and which is arranged substantially in parallel to an axis of said drive shaft, and said second gear is rotatable integrally with a nut member which is provided for said feed screw mechanism by the aid of a connecting member.

2. The electric clamp apparatus according to claim 1, wherein said feed screw mechanism includes a ball screw nut which is rotatable integrally with said second gear by the aid of a plurality of connecting pins, a ball screw shaft which is displaceable in an axial direction by making engagement with a penetrating screw hole of said ball screw nut, and a plurality of balls which are provided between said ball screw nut and said ball screw shaft and which make rolling movement along a circulating track.

3. The electric clamp apparatus according to claim 1, wherein a brake mechanism for stopping rotation of said drive shaft of said rotary driving source upon cutoff of power source is arranged at a portion disposed closely to said rotary driving source.

4. The electric clamp apparatus according to claim 1, wherein said toggle link mechanism includes a link plate which Is connected to a first end side of a ball screw shaft provided for said feed screw mechanism, and it is provided with a needle roller for making engagement with a circular arc-shaped side surface section of said link plate.

5. The electric clamp apparatus according to claim 4, wherein said toggle link mechanism includes a knuckle block to which a pair of metal detecting objects are connected via a dog, and It is provided with sensors for sensing said metal detecting objects which are displaceable in accordance with rotary action of said clamp arm.

6. The electric clamp apparatus according to claim 1, wherein a diameter of said second gear is set to be larger than a diameter of said first gear.

7. An electric clamp apparatus capable of gripping-a workpiece by means of a rotatable clamp arm, said clamp apparatus comprising:

a rotary driving source for making rotary driving in accordance with an electric signal;

a gear mechanism for transmitting rotary driving force of said rotary driving source;

a feed screw mechanism for converting rotary motion transmitted by said gear mechanism into rectilinear motion;

a toggle link mechanism for converting said rectilinear motion transmitted by said feed screw mechanism into rotary action of said clamp arm; and a buffering mechanism for buffering shock generated when said rotatable clamp arm arrives at a displacement terminal position.

8. The electric clamp apparatus according to claim 7, wherein said buffering mechanism includes a piston which is displaceable integrally with a ball screw shaft provided for said feed screw mechanism, and a throttle valve for throttling a flow rate of air to be discharged to the outside from the inside of a chamber by being pressed by said piston.

9. The electric clamp apparatus according to claim 8, wherein said throttle valve includes a first throttle valve which functions to throttle said air to be discharged to the outside when said clamp arm is rotated in a first direction to arrive at a clamped state, and a second throttle valve which functions to throttle said air to be discharged to the outside when said clamp arm is rotated in a second direction to arrive at an initial position in an unclamped state.

10. The electric clamp apparatus according to claim 7, wherein said gear mechanism includes a first gear which is coaxially connected to a drive shaft of said rotary driving source, a second gear which is arranged substantially in parallel to an axis of said drive shaft, and an intermediate gear which is arranged between said first gear and said second gear, and said second gear is rotatable integrally with a nut member which is provided for said feed screw mechanism by the aid of a connecting member.

11. The electric clamp apparatus according to claim 7, wherein said feed screw mechanism includes a ball screw nut which is rotatable integrally with said second gear by the aid of a plurality of connecting pins, a ball screw shaft which is displaceable in an axial direction by making engagement with a penetrating screw hole of said ball screw nut, and a plurality of balls which are provided between said ball screw nut and said ball screw shaft and which make rolling movement along a circulating track.

12. The electric clamp apparatus according to claim 7, wherein a brake mechanism for stopping rotation of a drive shaft of said rotary driving source upon cutoff of power source is arranged at a portion disposed closely to said rotary driving source.

13. The electric clamp apparatus according to claim 7, wherein said toggle link mechanism includes a link plate which is connected to a first end side of a ball screw shaft provided for said feed screw mechanism, and it is provided with a needle roller for making engagement with a circular arc-shaped side surface section of said link plate.

14. The electric clamp apparatus according to claim 13, wherein said toggle link mechanism includes a knuckle block to which a pair of metal detecting objects are connected via a dog, and it is provided with sensors for sensing said metal detecting objects which are displaceable in accordance with rotary action of said clamp arm.

15. The electric clamp apparatus according to claim 7, wherein a diameter of said second gear is set to be larger than a diameter of said first gear.

* * * * *